(12) United States Patent
Watanabe et al.

(10) Patent No.: US 6,660,433 B2
(45) Date of Patent: Dec. 9, 2003

(54) LITHIUM SECONDARY BATTERY AND BATTERY DEVICE COMPRISING SAME

(75) Inventors: Hiroshi Watanabe, Sumoto (JP); Shiori Nakamizo, Amagasaki (JP); Satoshi Narukawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 196 days.

(21) Appl. No.: 09/734,568

(22) Filed: Dec. 13, 2000

(65) Prior Publication Data

US 2003/0190499 A1 Oct. 9, 2003

(30) Foreign Application Priority Data

Dec. 14, 1999 (JP) .......................... P. 11-354388

(51) Int. Cl.[7] .......................... H01M 4/58; H01M 6/14; H02J 7/00
(52) U.S. Cl. .................. 429/231.95; 429/7; 429/142; 429/247; 429/249; 429/250; 429/300; 429/303; 320/127
(58) Field of Search .............. 429/231.95, 142, 429/7, 300, 303, 247, 249, 250; 320/127

(56) References Cited

U.S. PATENT DOCUMENTS 5,853,914 A * 12/1998 Kawakami ............... 429/66
6,489,061 B1 * 12/2002 Hossain .................. 429/231.1

FOREIGN PATENT DOCUMENTS

| EP | 0 851 521 | 7/1998 | |
| EP | 0 851 522 | 7/1998 | |
| EP | 0 866 511 | 9/1998 | |
| EP | 0866511 A2 * | 9/1998 | .......... H01M/10/40 |
| GB | 2 327 293 | 1/1999 | |
| JP | 4-171660 | 6/1992 | |
| JP | 8-507407 | 8/1996 | |
| JP | 10-64503 | 3/1998 | |
| JP | 10 64503 | 3/1998 | |
| JP | 10-189054 | 7/1998 | |
| JP | 10 255760 | 9/1998 | |
| JP | 11-16561 | 1/1999 | |
| JP | 11 204139 | 7/1999 | |
| JP | 11 329443 | 11/1999 | |
| JP | 2000-30742 | 1/2000 | |
| WO | 94/20996 | 9/1994 | |
| WO | 95/31835 | 11/1995 | |

* cited by examiner

Primary Examiner—Patrick Ryan
Assistant Examiner—Angela J Martin
(74) Attorney, Agent, or Firm—Nixon & Vanderhye P.C.

(57) ABSTRACT

A lithium secondary battery comprises a negative electrode capable of intercalating/deintercalating lithium ion, a positive electrode made of a lithium-containing metal oxide as an active positive material, and a nonaqueous electrolyte, and a polyvinylidene fluoride resin is disposed between said negative electrode and positive electrode so that the battery voltage doesn't rise beyond a predetermined value even when said battery is overcharged.

5 Claims, 6 Drawing Sheets

LITHIUM SECONDARY BATTERY AND BATTERY DEVICE COMPRISING SAME

BACKGROUND OF THE INVENTION

1. Field of the Invention

The present invention relates to a lithium secondary battery, for example a lithium secondary battery comprising a negative electrode capable of intercalating/deintercalating lithium ion, a positive electrode made of a lithium-containing metal oxide as an active positive material, a nonaqueous electrolyte and a separator for separating the positive electrode and the negative electrode from each other and a battery device comprising same.

2. Description of the Related Art

Recently, electronic apparatus have shown a remarkable reduction of size and weight thereof. Under these circumstances, it has been keenly desired to reduce the size and weight of battery as power supply. Accordingly, a lithium secondary battery such as lithium ion battery has been put to practical use as rechargeable battery having a small weight and high capacity. Such a lithium secondary battery has been used for portable electronic and communications apparatus such as small-sized video camera, portable telephone and note type personal computer.

This type of a lithium secondary battery comprises as an active negative electrode material a carbon-based material capable of intercalating/deintercalating lithium ion, as an active positive electrode material a lithium-containing metal oxide such as $LiCoO_2$, $LiNiO_2$, $LiMn_2O_4$ and $LiFeO_2$, and an electrolytic solution obtained by dissolving a lithium salt as a solute in an organic solvent. These components are assembled into a battery. When this battery is charged for the first time, lithium ions eluted from the active positive electrode material enter in the carbon particles to make the battery chargeable and dischargeable.

As such a lithium secondary battery is overcharged, excess lithium ions are extracted from the positive electrode while excess lithium ions are intercalated in the negative electrode, causing the precipitation of metallic lithium. Extremely unstable high oxides are produced on the positive electrode side, where lithium ions have been lost. Further, when the battery voltage reaches higher than about 5.0 V during overcharging, the battery undergoes decomposition reaction of the organic solvent of the electrolytic solution that causes the production of a large amount of combustible gas and sudden exothermic reaction that causes abnormal heating of the battery, impairing the battery safety. These circumstances cause an important problem as the energy density of the lithium secondary battery increases.

As mentioned above, when a phenomenon involving abnormal heating of battery occurs, the constituent materials of battery such as positive electrode, negative electrode and electrolytic solution undergo denaturation that makes it impossible to maintain the desired battery properties. Further, this phenomenon should be avoided from the standpoint of maintenance of battery safety. Accordingly, at present, this type of secondary lithium batteries are always used with a protective circuit for preventing overcharging incorporated therein.

A nickel-cadmium storage battery or the like is arranged to prevent overcharging through subtle utilization of a gas absorption mechanism that oxygen produced at the positive electrode side during overcharging is reacted with hydrogen at the negative electrode side to produce water. However, a lithium secondary battery comprising an organic solvent is almost unable to utilize such a gas absorption mechanism in principle at present. It is thus inevitably necessary that a lithium secondary battery comprising an organic solvent comprise a protective circuit for preventing overcharging incorporated therein.

However, the protective circuit for preventing overcharging requires a complicated control technique and thus becomes a cause that adds to the total cost of the battery. Further, since practically used secondary lithium batteries have a protective circuit device provided in a battery pack, the occupying volume and weight of the protective circuit also becomes a cause that reduces the substantial energy density, particularly volume energy density ($Wh/m^3$), of the battery.

Under these circumstances, the inventors made studies. As a result, it was found that if a lithium secondary battery which cannot be overcharged is obtained, it is not necessary to provide a protective circuit for preventing overcharging. The present invention has been worked out on the basis of this knowledge. It is therefore an object of the invention to provide a lithium secondary battery which cannot be overcharged and a battery device which comprises such a lithium secondary battery to eliminate the necessity of providing a protective circuit therein.

In order to accomplish the foregoing object of the invention, the lithium secondary battery of the invention comprises a negative electrode capable of intercalating/deintercalating lithium ion, a positive electrode made of a lithium-containing metal oxide as an active positive material, and a nonaqueous electrolyte, wherein a polyvinylidene fluoride resin is disposed between said negative electrode and positive electrode so that the battery voltage doesn't rise beyond a predetermined value even when said battery is overcharged.

Preferably the lithium secondary battery of the invention comprises a negative electrode capable of intercalating/deintercalating lithium ion, a positive electrode made of a lithium-containing metal oxide as an active positive material, a nonaqueous electrolyte and a separator comprising a polyvinylidene fluoride resin for separating the positive electrode and the negative electrode from each other, whereby the battery voltage doesn't rise beyond a predetermined value, i.e., 5.0 V, even when the lithium secondary battery is overcharged.

A lithium secondary battery was prepared by disposing a negative electrode capable of intercalating/deintercalating lithium ion (e.g., graphite) and a lithium-containing metal oxide (e.g., lithium-containing cobalt oxide) with a separator comprising a polyvinylidene fluoride (PVdF) provided interposed therebetween, and then injecting a non-aqueous electrolyte thereinto. When the inventors made an overcharging test (overcharging with electricity corresponding to at least 400% of the battery capacity) on this lithium secondary battery, a surprising phenomenon was shown that the battery voltage doesn't rise beyond a predetermined value (particularly 5.0 V) (see FIG. 5).

The reason for this phenomenon is not made obvious at present. However, it can be presumed as follows. In other words, a polyvinylidene fluoride (PVdF) resin has excellent electrical insulation properties and is highly capable of retaining an electrolytic solution thereinside to exhibit a high ionic conductivity. Thus, a polyvinylidene fluoride (PVdF) resin provides an excellent separator material. A battery prepared from such a polyvinylidene fluoride (PVdF) resin as a separator material shows a change of the chemical or electrical properties of the polyvinylidene fluoride (PVdF) resin when the battery voltage shows an abnormal rise to about 4.5 V upon overcharging. In this manner, current flowing upon overcharging is consumed through a reaction process different from the inherent charging reaction of active positive electrode material or active negative electrode material.

The mechanism of the establishment of such a separate reaction process can be considered as follows, though being inference:

i) When the battery is overcharged, the polyvinylidene fluoride (PVdF) partly reacts with a part of lithium or electrolytic solution to form a reaction seed taking part in a reversal electrochemical reaction (redox reaction). The reaction seed migrates between the positive electrode and the negative electrode to inhibit other reactions (charge reaction).

ii) The same participation as in the mechanism (i) causes decomposition reaction of solvent accompanied by no production of gas.

iii) When the battery is overcharged, the electrical insulation of the polyvinylidene fluoride (PVdF) is destroyed to form an electronic conductor having a certain resistivity.

Thus, there occurs an internal short-circuiting only when the battery is overcharged. Accordingly, an ordinary electrochemical reaction (reaction of electron with ion) doesn't occur. Therefore, the polyvinylidene fluoride (PVdF) acts as a mere resistor.

From the standpoint of the foregoing mechanism, when a battery device is formed by a lithium secondary battery which shows no rise of battery voltage beyond a predetermined value even when overcharge, the same overcharging properties as obtained with a protective circuit for preventing overcharging can be obtained without being provided with any such a protective circuit. This eliminates the necessity of packaging the battery with such a protective circuit as practiced conventionally. Thus, the volume of the protective circuit required to occupy in the container or battery packaging container becomes unnecessary. Accordingly, the substantial energy density of the battery (particularly volume energy density: $Wh/m^3$) can be enhanced.

By thus making the protective circuit unnecessary, this type of battery devices can be produced through less production steps and hence at a reduced cost.

10 . . . Separator (composite resin membrane), 20 . . . Positive electrode plate, 21a . . . Positive electrode collector tab, 30 . . . Negative electrode plate, 31a . . . Negative electrode collector tab, 40 . . . Laminate outer case, 50 . . . Charging circuit, 51 . . . DC power supply, 60 . . . Battery pack, 61 . . . Circuit board comprising protective circuit, 62 . . . Battery pack container

DESCRIPTION OF THE PREFERRED EMBODIMENTS

Figure 1:
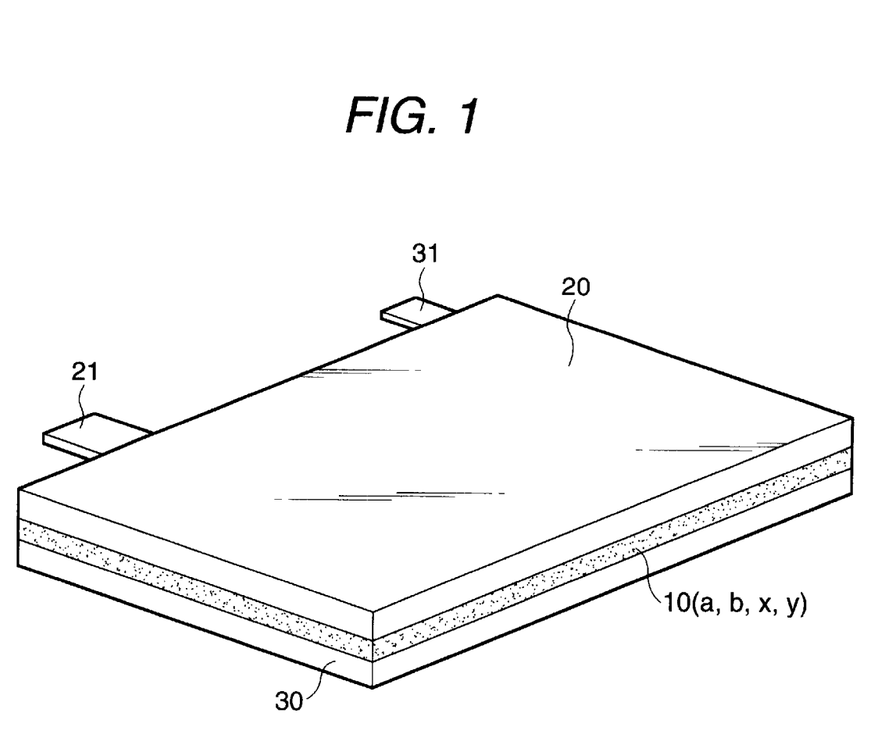
FIG. 1 is a perspective view diagrammatically illustrating how a positive electrode plate and a negative electrode plate are laminated with a separator provided interposed therebetween.
Figure 2:
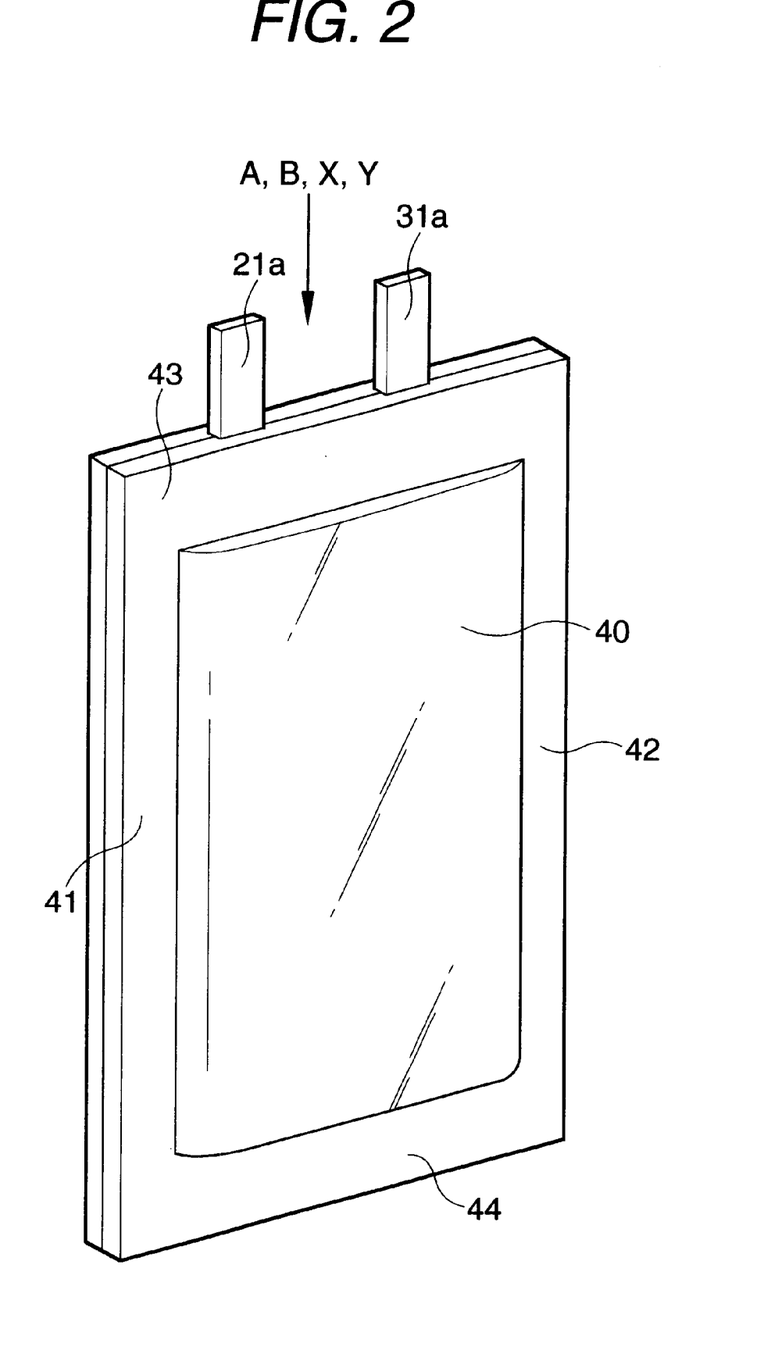
FIG. 2 is a perspective view diagrammatically illustrating a lithium secondary battery formed by winding the laminate of FIG. 1 and then receiving the laminate thus wound in a laminate outer case.
Figure 3:
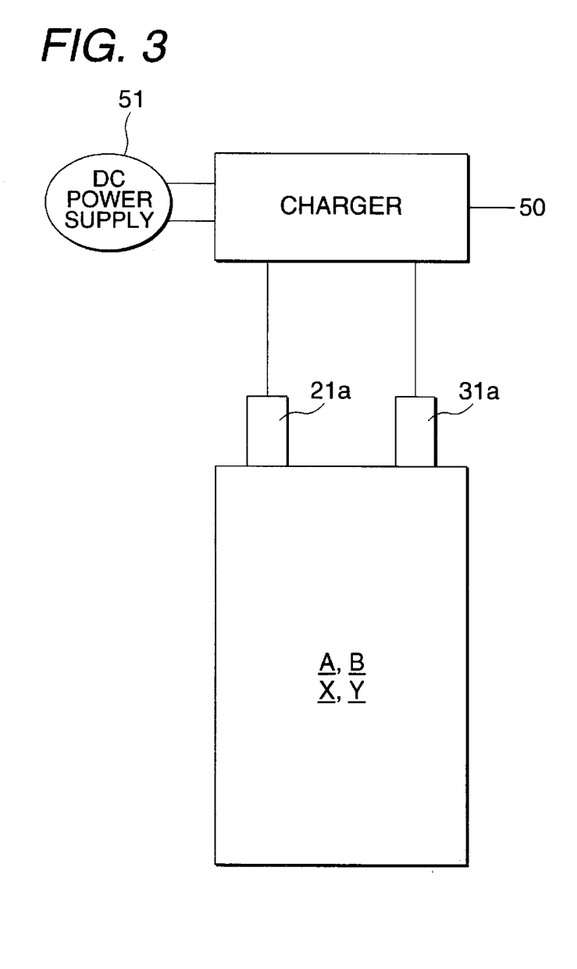
FIG. 3 is a view diagrammatically illustrating how such a lithium secondary battery received in a battery device for portable telephone is connected to a charger.
Figure 4:
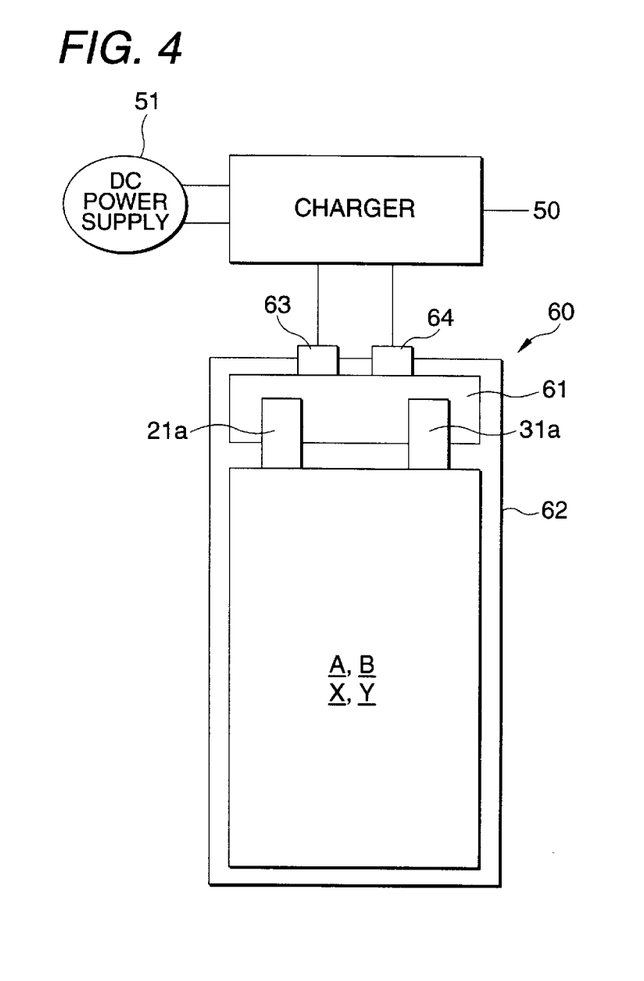
FIG. 4 is a view diagrammatically illustrating how a battery pack obtained by adding a protective circuit to such a lithium secondary battery is received in a battery device for portable telephone and connected to a charger.

An embodiment of implication of the lithium secondary battery and battery device according to the present invention will be described hereinafter in connection with FIGS. 1 to 4. FIG. 1 is a perspective view diagrammatically illustrating how a positive electrode plate and a negative electrode plate are laminated with a separator provided interposed therebetween. FIG. 2 is a perspective view diagrammatically illustrating a lithium secondary battery formed by winding the laminate and then receiving the laminate thus wound in a laminate outer case. FIG. 3 is a view diagrammatically illustrating how such a lithium secondary battery received in a battery device for portable telephone is connected to a charger. FIG. 4 is a view diagrammatically illustrating how a battery pack obtained by adding a protective circuit to such a lithium secondary battery is received in a battery device for portable telephone and connected to a charger.

1. Preparation of Separator (1) EXAMPLE 1

As a reinforcing material there was used a non-woven cloth of polyethylene terephthalate (PET) having a thickness of 30 μm. The non-woven cloth of polyethylene terephthalate (PET) was then impregnated with a polyvinylidene fluoride (PVdF) resin to give an integrated body. Thus, a separator 10 made of composite resin film was prepared. The separator 10 was then used as a separator a in Example 1.

(2) EXAMPLE 2

As a reinforcing material there was used a mircoporous membrane of polyethylene (PE). A polyvinylidene fluoride (PVdF) resin was then bonded to the mircoporous membrane of polyethylene (PE) on both surfaces thereof to give an integrated laminate. Thus, a separator 10 made of composite resin film was prepared. The separator 10 was then used as a separator b in Example 2.

(3) Comparative Example 1

No polyvinylidene fluoride (PVdF) resin was used. Only a non-woven cloth of polyethylene terephthalate (PET) having a thickness of 30 μm was used to prepare a separator 10. The separator 10 was then used as a separator x in Comparative Example 1.

(4) Comparative Example 2

No polyvinylidene fluoride (PVdF) resin was used. Only a mircoporous membrane of polyethylene (PE) having a thickness of 30 μm was used to prepare a separator 10. The separator 10 was then used as a separator y in Comparative Example 2.

As the foregoing polyvinylidene fluoride there may be used a vinylidene fluoride homopolymer or a vinylidene fluoride copolymer of vinylidene fluoride with one or more selected from the group consisting of ethylene trifluorochloride, ethylene tetrafluoride, propylene hexafluoride and ethylene.

2. Preparation of Positive Electrode Plate

An active positive electrode material made of a lithium-containing cobalt dioxide ($LiCoO_2$) which had been subjected to heat treatment at a temperature of from 700° C. to 900° C., graphite and kitchen black as an electrically conducting material and a fluororesin as a binder were mixed at a weight ratio of 90:3:2:5. The mixture was then dissolved in an organic solvent comprising N-methyl-2-pyrrolidone (NMP) to prepare a paste.

The paste thus prepared was uniformly applied to a metal core (e.g., aluminum foil having a thickness of 20 μm) 21 on both surfaces thereof by doctor blade method. Subsequently, the coated material was passed through a dryer which had been heated, subjected to vacuum heat treatment at a temperature of from 100° C. to 150° C. to remove the organic solvent which had been needed during the preparation of paste, and then rolled to a thickness of 0.17 mm through a roll press to prepare a positive electrode plate 20.

3. Preparation of Negative Electrode Plate

Separately, an active negative electrode material made of natural graphite (d=3.36 Å) and a fluororesin as a binder were mixed at a weight ratio of 95:5. The mixture was then dissolved in an organic solvent comprising N-methyl-2-pyrrolidone (NMP) to prepare a paste. The paste thus prepared was then uniformly applied entirely to a metal core (e.g., copper foil having a thickness of 20 μm) 31 on both surfaces thereof by doctor blade method. Subsequently, the coated material was passed through a dryer which had been heated, subjected to vacuum heat treatment at a temperature of from 100° C. to 150° C. to remove the organic solvent which had been needed during the preparation of paste, and then rolled to a thickness of 0.14 mm through a roll press to prepare a negative electrode plate 30.

4. Preparation of Lithium Secondary Battery

To the core material 21 of the positive electrode plate 20 thus prepared was attached a positive electrode collector tab 21a. To the core material 31 of the negative electrode plate 30 was attached a negative electrode collector tab 31a. The two electrode plates were then laminated with the separators 10 made of resin membranes a, b, x and y provided interposed therebetween. Thereafter, the laminate thus prepared was wound by a winder (not shown). The laminate thus wound was then fixed on the periphery thereof with a tape to prepare a spirally wound electrode body. The spirally wound electrode body was then squeezed to flatness to prepare a tabular body.

Subsequently, $LiPF_6$ and $LiN(SO_2C_2F_5)_2$ were dissolved as electrolyte salts in a 3:7 (by volume) mixture of ethylene carbonate (EC) and diethyl carbonate (DEC) in a concentration of 0.05 mol/l and 0.95 mol/l, respectively, to prepare an electrolytic solution.

Subsequently, a 5-layer laminate material comprising a polyethylene terephthalate (PET), an adhesive, aluminum, an adhesive and an adhesive layer made of polypropylene as viewed from outside was laminated at the edge thereof. The pair of laminates were heat-sealed at the edge thereof to form sealed portions 41 and 42. Thus, a cylindrical outer case 40 was prepared.

Subsequently, as shown in FIG. 2, the tabular body formed by squeezing a spirally wound electrode body was inserted into the outer case 40 in an arrangement such that the positive electrode collector tab 21a and the negative electrode collector tab 31a come out of one of the openings of the outer case 40. The one opening of the outer case 40 was then heat-sealed with the positive electrode collector tab 21a and the negative electrode collector 31a being put between the edges of the opening to form a sealed portion 43.

Subsequently, the electrolytic solution thus prepared was injected into the outer case through the other opening of the outer case. The opening was heat-sealed to form a sealed portion 44. Thus, the outer case was sealed. As a result, four secondary lithium batteries A, B, X and Y were prepared. The secondary lithium batteries A, B, X and Y thus prepared each had a capacity of 500 mAh.

In some detail, the lithium secondary battery prepared from the composite resin membranes of Example 1 was designated as battery A, the lithium secondary battery prepared from the composite resin membrane b of Example 2 was designated as battery B, the lithium secondary battery prepared from the composite resin membrane x of Comparative Example 1 was designated as battery X, and the lithium secondary battery prepared from the composite resin membrane y of Comparative Example 2 was designated as battery Y.

5. Battery Device (1) Battery Device Comprising Single Battery

Subsequently, as shown in FIG. 3, the secondary lithium batteries A, B, X and Y thus prepared were each received in a battery housing of various battery devices (not shown) (e.g., electronic apparatus such as portable telephone and note type personal computer) to prepare battery devices comprising a single battery, respectively. Thereafter, to the terminal formed at the battery housing of these battery devices was connected a lead wire extending from a charger 50. To the charger 50 was connected a DC power supply 51. By switching the power supply 51 on, the secondary lithium batteries A, B, X and Y begin to be charged.

The battery device comprising a single battery may be in a form comprising a single battery received in a battery housing, a form comprising a battery block consisting of a series combination of these single batteries received in a battery housing, a form comprising a battery block consisting of a parallel combination of these single batteries received in a battery housing or a form comprising a battery block consisting of a series combination of these single batteries and a parallel combination of these single batteries received in a battery housing. The charger 50 may be either incorporated in the electronic apparatus or provided separately of the electronic apparatus.

(2) Battery Device Comprising Battery Pack

Separately, the secondary lithium batteries A, B, X and Y thus prepared were each connected to the connecting portion of a protective circuit board 61 provided with a protective circuit for preventing overcharging at the collector tabs (positive and negative electrode terminals) 21a and 31a thereof. These batteries were each received in a battery pack container 62 which was then sealed to prepare a battery pack 60.

Subsequently, these battery packs 60 were each received in the housing of various battery devices (not shown) (e.g., electronic apparatus such as portable telephone and note type personal computer) to prepare battery devices comprising battery pack. Thereafter, to the positive electrode terminal 63 and the negative electrode terminal 64 of these battery packs 60 was connected a lead wire extending from the charger 50.

The comparison of the volume of the single batteries A, B, X and Y with that of the battery pack 60 shows that the battery pack 60 has a volume of as great as 64% greater than that of the single battery because the volume of the protective circuit board 61 and the volume of the thickness of the battery pack container 62 are added to that of the single battery.

The battery pack 60 may be not only in a form comprising a single battery received in a battery pack container 62 but also in a form comprising a series combination of single batteries received in a battery pack container 62, a form comprising a parallel combination of single batteries received in a battery pack container 62 or a form comprising a series combination of single batteries and a parallel combination of single batteries received in a battery pack container 62. The protective circuit is an overcharging protective circuit arranged to detect when the battery voltage reaches a predetermined value (e.g., 4.35 V) upon charging and then suspend the subsequent charging operation.

The term "charging circuit" as used herein is meant to indicate a circuit capable of supplying charging current into a battery (single battery, battery block, battery pack, etc.) and provided with functional circuits necessary for charging such as control circuit for monitoring the time elapsed from the beginning of charging, charge capacity, output voltage, etc. and comparing it with a predetermined value and a switch circuit for receiving charging suspension order from the control circuit and suspending the supply of current to the battery. The charger 50 indicates a part of such a charging circuit or a packaging of all these functions.

6. Continuous Overcharging Test

Subsequently, by switching the DC power supply 51 connected to the various chargers 50 on, the following overcharging test was effected.

Figure 5:
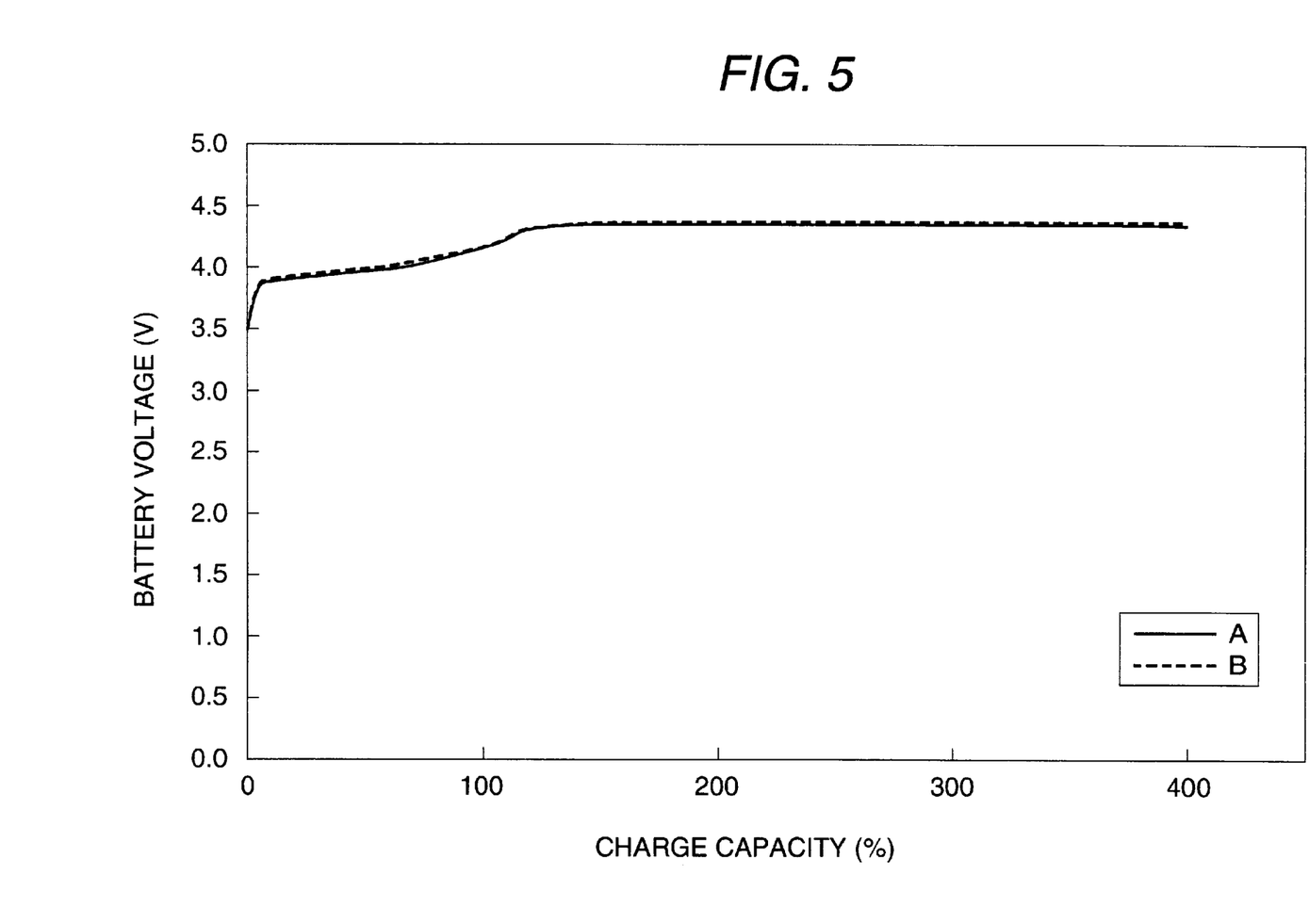
FIG. 5 is a graph illustrating the battery voltage (V) versus the charge capacity (%) in the case where a battery of the invention is overcharged free from any overcharging protective circuit.
Figure 6:
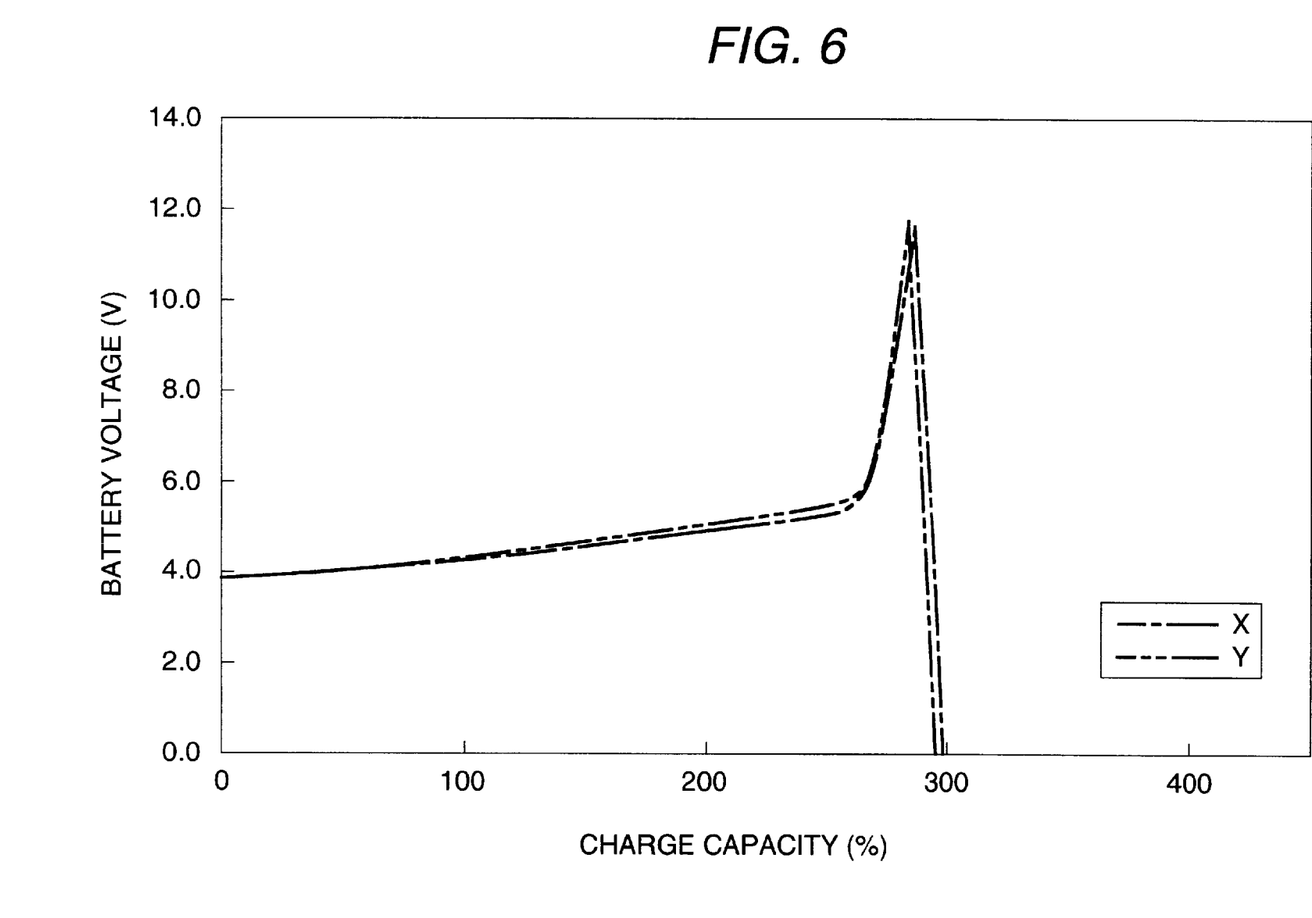
FIG. 6 is a graph illustrating the battery voltage (V) versus the charge capacity (%) in the case where a battery of conventional example (comparative example) is overcharged free from any overcharging protective circuit.
Figure 7:
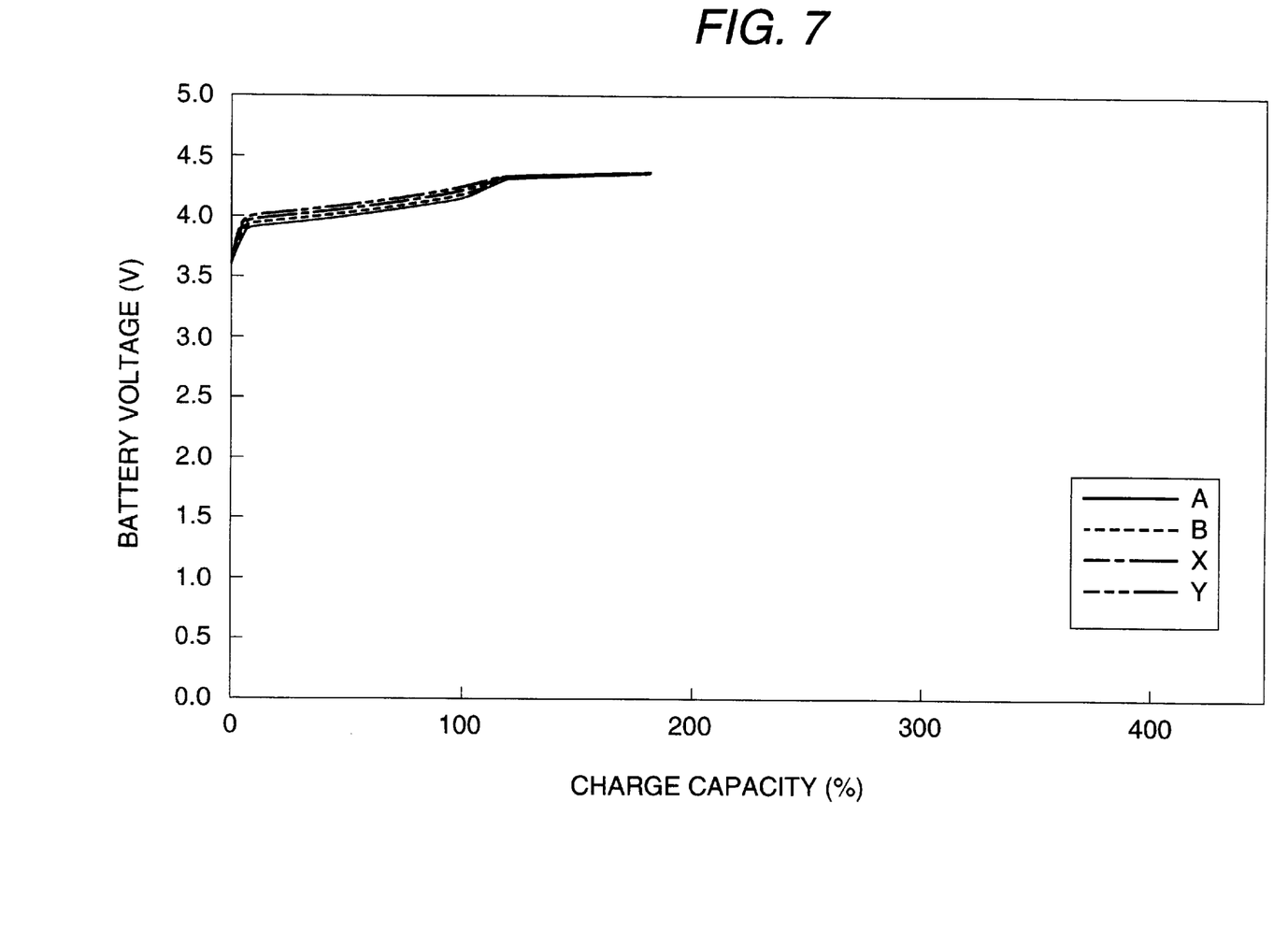
FIG. 7 is a graph illustrating the battery voltage (V) versus the charge capacity (%) in the case where batteries of the invention and conventional example (comparative example) are overcharged with an overcharging protective circuit added thereto.

In some detail, the batteries were each continuously subjected to constant current charging with a current of 500 mA (1C) for 4 hours (amount of electricity charged corresponds to 40% of the battery capacity). During charging, the batteries were each measured for battery voltage at a predetermined time interval (every a certain charge capacity). The measurements were graphically plotted with charge capacity (%) as abscissa and battery voltage (V) as ordinate. The results are as shown in FIGS. 5 to 7. The secondary lithium batteries A, B, X and Y were each measured for change of thickness between before and after overcharging test. The secondary lithium batteries A, B, X and Y were also each subjected to discharge test after overcharging test. The results are set forth in Table 1 below.

TABLE 1

| Type of battery | | Voltage rise | Maximum Voltage (V) | Increase of thickness | Maximum Increase of thickness (mm) | Can be discharged |
|---|---|---|---|---|---|---|
| No protective circuit | A | None | 4.38 | No | 0.00 | Yes |
| | B | None | 4.38 | No | 0.00 | Yes |
| | X | Some | 12.00 | Yes | 2.85 | No |
| | Y | Some | 12.00 | Yes | 2.80 | No |
| Provided with protective circuit | A | None | 4.35 | No | 0.00 | Yes |
| | B | None | 4.35 | No | 0.00 | Yes |
| | X | None | 4.35 | No | 0.00 | Yes |
| | Y | None | 4.35 | No | 0.00 | Yes |
| No protective circuit | C | None | 4.36 | No | 0.00 | Yes |
| | D | None | 4.37 | No | 0.00 | Yes |
| | E | None | 4.39 | No | 0.01 | Yes |
| | F | None | 4.42 | No | 0.12 | Yes |
| | G | None | 4.95 | No | 0.35 | Yes |

TABLE 1-continued

| Type of battery | | Voltage rise | Maximum Voltage (V) | Increase of thickness | Maximum Increase of thickness (mm) | Can be discharged |
|---|---|---|---|---|---|---|
| Provided with protective circuit | C | None | 4.35 | No | 0.00 | Yes |
| | D | None | 4.35 | No | 0.00 | Yes |
| | E | None | 4.35 | No | 0.00 | Yes |
| | F | None | 4.35 | No | 0.00 | Yes |
| | G | None | 4.35 | No | 0.00 | Yes |

C: PVdF monorisic mircoporous membrane

D,E,F,G: polyvinylidene fluoride (PVdF) resin is bonded to both surfaces of the mircoporous membrane to form an integrated laminate at each PVdF ratio as follows.

| | PVdF | PE |
|---|---|---|
| C | 100 | |
| D | 80 | 20 |
| E | 20 | 80 |
| F | 10 | 90 |
| G | 5 | 95 |

As can be seen in FIG. 5 and Table 1, the batteries A and B, despite being free of protective circuit, showed no rise of battery voltage beyond 4.5 V and no increase of battery thickness even when overcharged with electricity corresponding to 400% of the battery capacity. After the termination of overcharging test, these batteries were then discharged with current of 500 mA (1C). When the battery voltage reached 2.75 V, discharge was then terminated. The discharge capacity was then determined from the discharge time. The results show that 70% of the initial battery capacity can be discharged, demonstrating that these batteries are little liable to deterioration of battery capacity.

The reason for this phenomenon is presumably because when the voltage of the lithium secondary battery of the invention reaches a range of from 4.2 V to 4.3 V, the polyvinylidene fluoride (PVdF) resin shows a change of chemical or electrical properties that causes overcharging current during overcharging is consumed through a reaction process different from the inherent charging reaction of active positive electrode material or active negative electrode material. However, the true reason is not made obvious at present.

On the contrary, as can be seen in FIG. 6 and Table 1, the batteries showed a sudden rise of battery voltage when overcharged with electricity corresponding to more than 250% of the battery capacity, and then immediately showed a battery voltage of 0 V and an increase of battery thickness. This is presumably because the sudden rise of battery voltage is immediately followed by internal short-circuiting that causes the battery voltage to drop to 0 V and the electrolytic solution to decompose and produce gas. This made it impossible for these batteries to be subsequently charged and discharged.

As can be seen in FIG. 7 and Table 1, even if the batteries A, B, X and Y with a protective circuit for preventing overcharging added thereto were overcharged with electricity corresponding to 400% of the battery capacity, charging current was interrupted when the battery voltage reached 4.35 V, which is the predetermined voltage of the protective circuit. After the termination of overcharging test, these batteries were then discharged with current of 500 mA (1C).

When the battery voltage reached 2.75 V, discharge was then terminated. The discharge capacity was then determined from the discharge time. The results show that 70% of the initial battery capacity can be discharged.

A composition ratio of polyvinylidene fluoride (PVdF) resin in the separator is preferably 5–100 wt %, more preferably 20–80 wt %. In the case that the composition ratio of polyvinylidene fluoride (PVdF) resin is in excess of 80 wt %, the separator is not useful. Since the separator whose composition ration is near to PVdF monolithic membrane is too weak in mechanical strength, mass production cannot be performed. And since separator is easy to have a wrinkle, battery characteristics is easy to be lowered.

Further, as explained in example 2, a polyvinylidene fluoride (PVdF) resin bonded to the mircoporous membrane of polyethylene (PE) on both surfaces thereof to give an integrated laminate is used as a separator 10 to construct a lot of batteries varying a composition ration of PVdF.

And then maximum voltage, maximum thickness increase, discharge ability, and voltage rise are measured for each of the batteries (C,D,E,F,and G). A part of the result is shown in FIGS. 5 and 6.

Maximum voltage is defined as a maximum voltage of the battery at overcharging. As shown in FIG. 5, in batteries A and B the battery voltage gets flat on overcharging and effect of overcharge inhibiting effect can be confirmed. Contrary that, as shown in FIG. 6, in batteries X and Y the battery voltage suddenly rise to 12 V at one point. This is the reason why inner resistance of the battery rises to the maximum voltage, 12V, and after that, inner short circuit caused by abnormal accident (for example shrink of the separator) of the battery is occurred.

Overcharging protective circuit is set to 4.35 V. Therefore maximum voltage of all batteries with overcharging protective circuit is 4.35 V. And in the case of the battery without overcharging protective circuit, maximum voltage of the battery using a separator in which the composition ratio of polyvinylidene fluoride (PVdF) resin is less than 50 wt %, is about 4.38 V (constant). Further while the composition ratio of polyvinylidene fluoride (PVdF) resin decreases, the maximum voltage becomes higher. The increase quantity of thickness of the separator increases accompanied with the voltage increase. This is the reason why velocity of the dissolving reaction of the electrolyte is accelerated rapidly, while the composition ratio of polyvinylidene fluoride (PVdF) resin is lowered.

As mentioned above, the lithium secondary battery of the invention shows no rise of battery voltage beyond 5.0 V even when overcharged. Thus, even free of any protective circuit for preventing overcharging, the lithium secondary battery of the invention can be drastically prevented from being damaged during overcharging, making it possible for themselves to be subsequently charged and discharged. This makes it possible to reduce the space for receiving the battery and hence further reduce the size of this type of battery devices.

The foregoing embodiment has been described with reference to the case where a 5-layer laminate material is used as an outer case. However, as the outer case there may be used an outer case made of metal such as stainless steel and aluminum besides the foregoing laminate material.

The foregoing embodiment has also been described with reference to the case where as an active negative electrode material there is used natural graphite (d=3.36 Å). However, a carbon material capable of intercalating/deintercalating lithium ion may be used besides natural graphite. Preferred examples of such a carbon material include carbon black, coke, glassy fiber, carbon fiber, and calcination product thereof.

The foregoing embodiment has also been described with reference to the case where as an active positive electrode material there is used $LiCoO_2$. A lithium-containing transition metal compound which receives lithium ion as a guest may be used besides $LiCoO_2$. Preferred examples of such a lithium-containing transition metal compound include $LiNiO_2$, $LiCo_xNi_{(1-x)}O_2$, $LiCrO_2$, $LiVO_2$, $LiMnO_2$, $LiFeO_2$, $LiTiO_2$, $LiScO2$, $LiYO_2$, and $LiMn_2O_4$. It is particularly preferred that $LiCoO_2$, $LiNiO_2$, $LiCo_xNi_{(1-x)}O_2$, and $LiMn_2O_4$ be used singly or in combination of two or more thereof.

As the electrolytic solution there may be used any ionic conductor obtained by dissolving a lithium salt as a solute in an organic solvent so far as it has a high ionic conductivity, behaves inertly chemically and electrochemically to the positive and negative electrodes and is inexpensive. As the organic solvent there may be preferably used propylene carbonate (PC), sulfolan (SL), tetrahydrofuran (THF), γ-butyrolactone (GBL) or mixture thereof besides the foregoing organic solvent.

Alternatively, a gel-like electrolyte containing a polymerizable compound such as acrylate-based polymer and urethane acrylate-based polymer may be used.

As the solute there may be used a lithium salt having a strong electrophilicity. Besides $LiPF_6$ or $LiN(SO_2C_2F_5)_2$, there may be preferably used $LiAsF_5$, $LiSO_3CF_3$, $LiN(SO_2CF_3)_2$ and $LiSO_3C_4F_9$, singly or in combination of two or more thereof.

A polyvinylidene fluoride resin can be included between the positive electrode and negative electrode, not as a separator.

What is claimed is:

1. A battery device comprising a lithium secondary battery and a charging circuit, wherein said lithium secondary battery comprises a negative electrode capable of intercalating/deintercalating lithium ion, a positive electrode made of a lithium-containing metal oxide as an active positive material, a nonaqueous electrolyte and a separator comprising a polyvinylidene fluoride for separating said positive electrode and said negative electrode from each other and said charging circuit comprises a charging circuit having no overcharging preventive function so that the battery voltage doesn't rise beyond a predetermined value even when said lithium secondary battery is overcharged.

2. A battery device comprising a lithium secondary battery and a charging circuit, wherein said lithium secondary battery comprises a negative electrode capable of intercalating/deintercalating lithium ion, a positive electrode made of a lithium-containing metal oxide as an active positive material, a nonaqueous electrolyte and a separator comprising a polyvinylidene fluoride for separating said positive electrode and said negative electrode from each other and said charging circuit comprises a charging circuit having an overcharging preventive function so that the battery voltage doesn't rise beyond a predetermined value even when said overcharging preventive function doesn't operate upon overcharging of said lithium secondary battery.

3. A battery device comprising a lithium secondary battery and a charging circuit, wherein said lithium secondary battery comprises a negative electrode capable of intercalating/deintercalating lithium ion, a positive electrode made of a lithium-containing metal oxide as an active positive material, a nonaqueous electrolyte and a separator comprising a polyvinylidene fluoride for separating said positive electrode and said negative electrode from each other and said charging circuit comprises a charging circuit having no overcharging preventive function so that the battery voltage doesn't rise beyond 5.0V even when said lithium secondary battery is overcharged.

4. A battery device comprising a lithium secondary battery and a charging circuit, wherein said lithium secondary battery comprises a negative electrode capable of intercalating/deintercalating lithium ion, a positive electrode made of a lithium-containing metal oxide as an active positive material, a nonaqueous electrolyte and a separator comprising a polyvinylidene fluoride for separating said positive electrode and said negative electrode from each other and said charging circuit comprises a charging circuit having no overcharging preventive function so that the battery voltage doesn't rise beyond a predetermined value even when said lithium secondary battery is overcharged with electricity corresponding to at least 400% of the battery capacity.

5. A battery device comprising a lithium secondary battery and a charging circuit, wherein said lithium secondary battery comprises a negative electrode capable of intercalating/deintercalating lithium ion and comprising a carbon material mainly composed of graphite, a positive electrode wherein at least one compound selected from the group consisting of lithium-containing cobalt oxide, lithium-containing nickel oxide and lithium-containing manganese oxide as an active positive material, a nonaqueous electrolyte and a separator comprising a polyvinylidene fluoride for separating said positive electrode and said negative electrode from each other and said charging circuit comprises a charging circuit having no overcharging preventive function so that the battery voltage doesn't rise beyond a predetermined value even when said lithium secondary battery is overcharged.

* * * * *